Aug. 9, 1932.   P. SCHEUER   1,870,875
SPEED REDUCING TRANSMISSION DEVICE
Filed July 8, 1930   4 Sheets-Sheet 1

Inventor.
Prosper Scheuer.
per J. Gevers
Attorney.

Aug. 9, 1932.  P. SCHEUER  1,870,875
SPEED REDUCING TRANSMISSION DEVICE
Filed July 8, 1930    4 Sheets-Sheet 2

Inventor:
Prosper Scheuer
per J. Severs
Attorney.

Aug. 9, 1932.  P. SCHEUER  1,870,875
SPEED REDUCING TRANSMISSION DEVICE
Filed July 8, 1930    4 Sheets-Sheet 3

Inventor.
Prosper Scheuer.
per J. Severn
Attorney.

Aug. 9, 1932.  P. SCHEUER  1,870,875
SPEED REDUCING TRANSMISSION DEVICE
Filed July 8, 1930   4 Sheets-Sheet 4
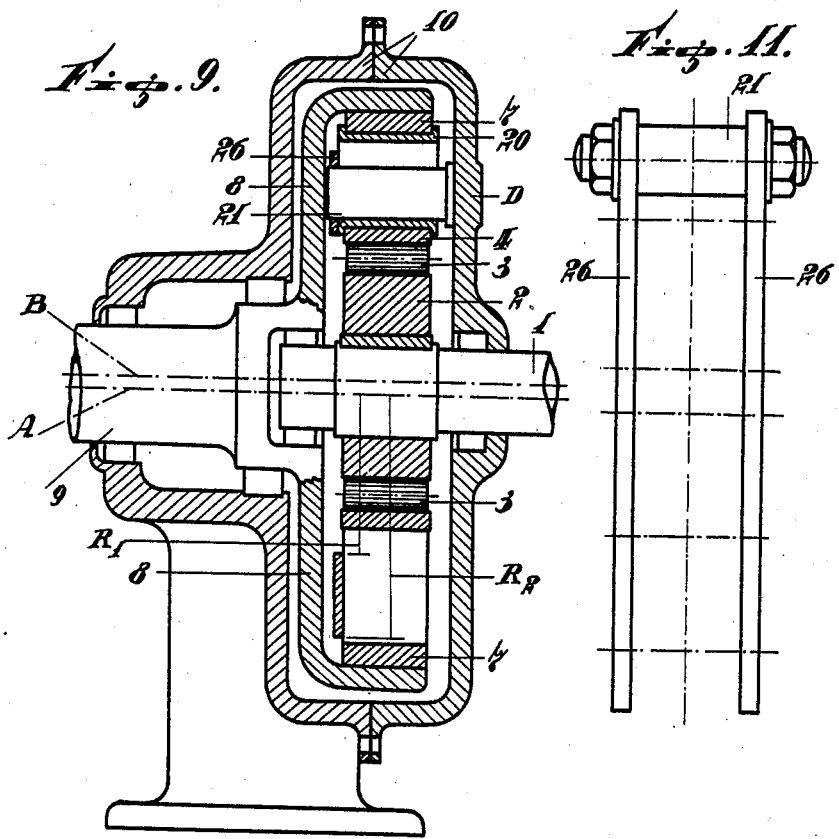
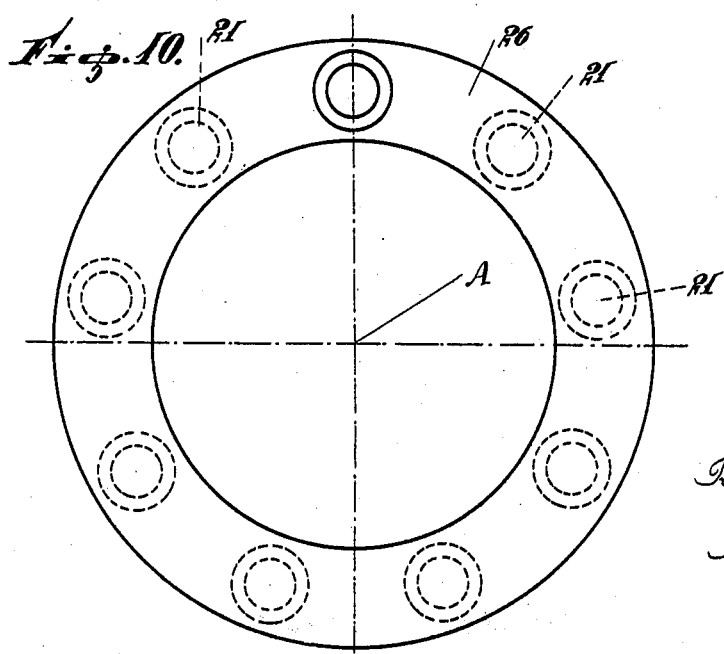

Patented Aug. 9, 1932

1,870,875

UNITED STATES PATENT OFFICE

PROSPER SCHEUER, OF GHENT, BELGIUM

SPEED REDUCING TRANSMISSION DEVICE

Application filed July 8, 1930, Serial No. 466,445, and in Belgium July 20, 1929.

My present invention relates to improvements in speed reducing gears of the type consisting of an eccentric drum, or driving member, mounted to rotate inside a hollow or driven member provided with an inside cam face, and of a number of planetary elements or rollers provided between said driving and driven members, whereby the rotation of the driving member is transmitted with reduced speed to the driven member, and in which each of the said rollers revolves around a fixed point in the manner of an eccentric.

According to my invention, I use either solid rollers, or hollow rollers or sleeves; in case of solid rollers, the number of these being in all cases equal to the number of raised portions of the cam face of the driven member minus one, whereas in case of hollow rollers their number is in all cases equal to the number of the said raised portions plus one.

In the case of hollow rollers, my construction differs from known constructions most essentially in that by providing a number of rollers equal to the number of said raised portions plus one, each of said rollers or sleeves revolves eccentrically around its own pin, in such a manner that the tangential component of the thrust of the driving member on each roller produces on the latter a couple which acts in the same sense of rotation as the couple produced by the perpendicular component of the same thrust. As a consequence of this, the thrust of each of the hollow rollers against the inside cam face of the driven member acts more tangentially to the surfaces in contact than in the known construction.

The invention will be described hereafter with reference to the accompanying drawings.

Fig. 9 is a vertical section of the transmission device with hollow transmission rollers following the axes of the shafts;

Figs. 10 and 11 illustrate constructional details of certain elements used in the transmission device.

Figure 1:
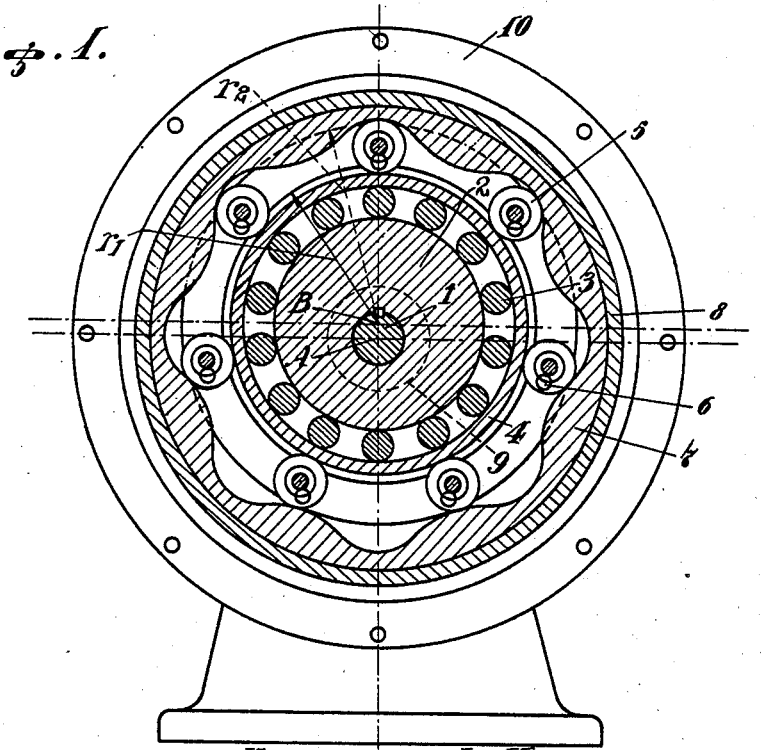
Fig. 1 is a vertical section of the speed reducing transmission device.

With reference to Figs. 1, 2, 3, 7, 8 and 9, reference number 1 designates the high speed shaft or driving shaft having the axis A. An eccentric disc 2 having a center B is keyed endwise on shaft 1. 3 is a roller bearing concentrically arranged about the eccentric 2 and bearing the guiding ring 4, the function of which will be to act as an intermediate element for the transmission of the movement of the eccentric 2 upon rollers 5, Figs. 1 to 3, or 20, Figs. 7 to 9.

Figure 2:
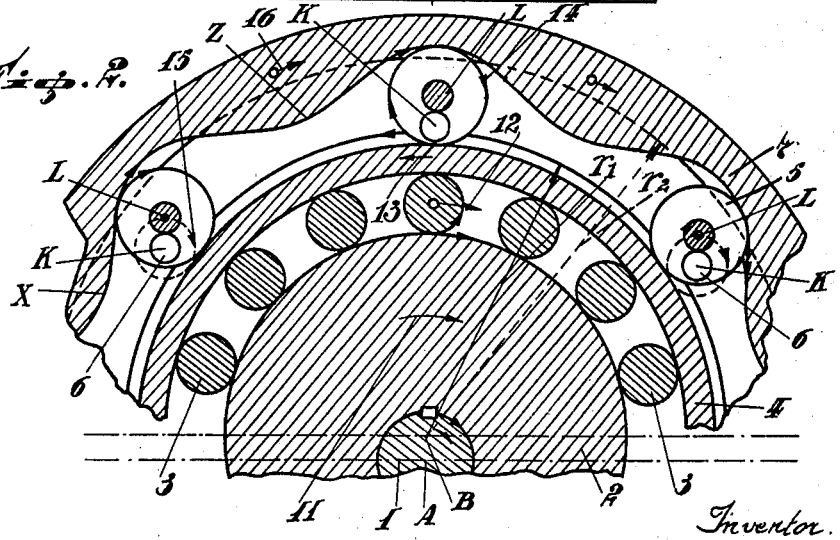
Fig. 2 is a part of the apparatus illustrated in Fig. 1, shown on a larger scale and illustrating the relative movements of the individual elements of the apparatus.
Figure 3:
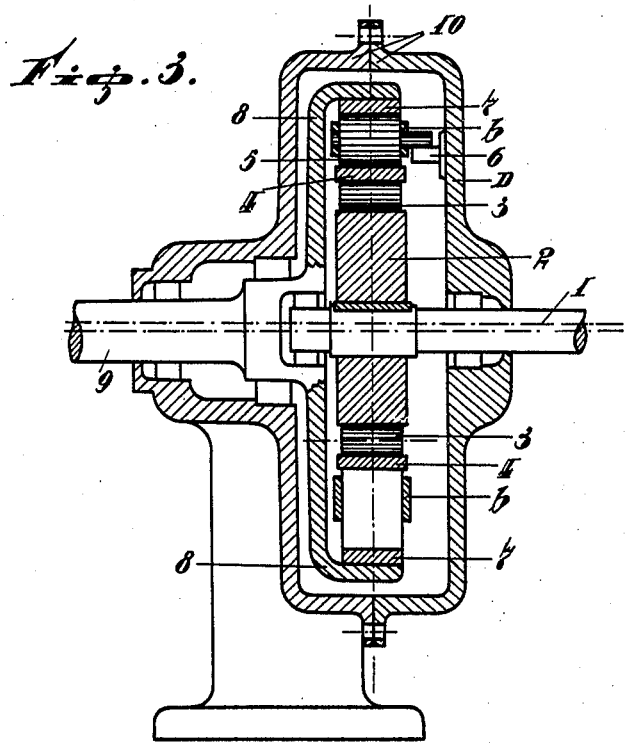
Fig. 3 is a vertical section of the transmission device following the axes of the shafts.

In Figs. 1, 2 and 3 are illustrated the solid rollers 5 having the axis L.

Figure 4:
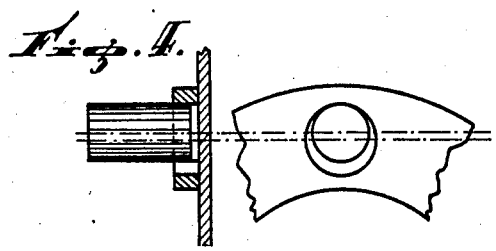
Figs. 4, 5 and 6 illustrate constructional details.
Figure 5:
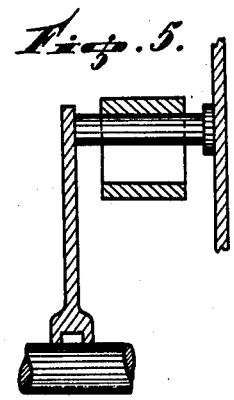
Figure 6:
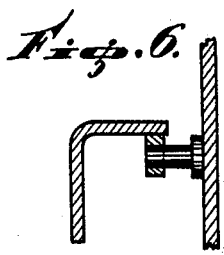
Figure 7:
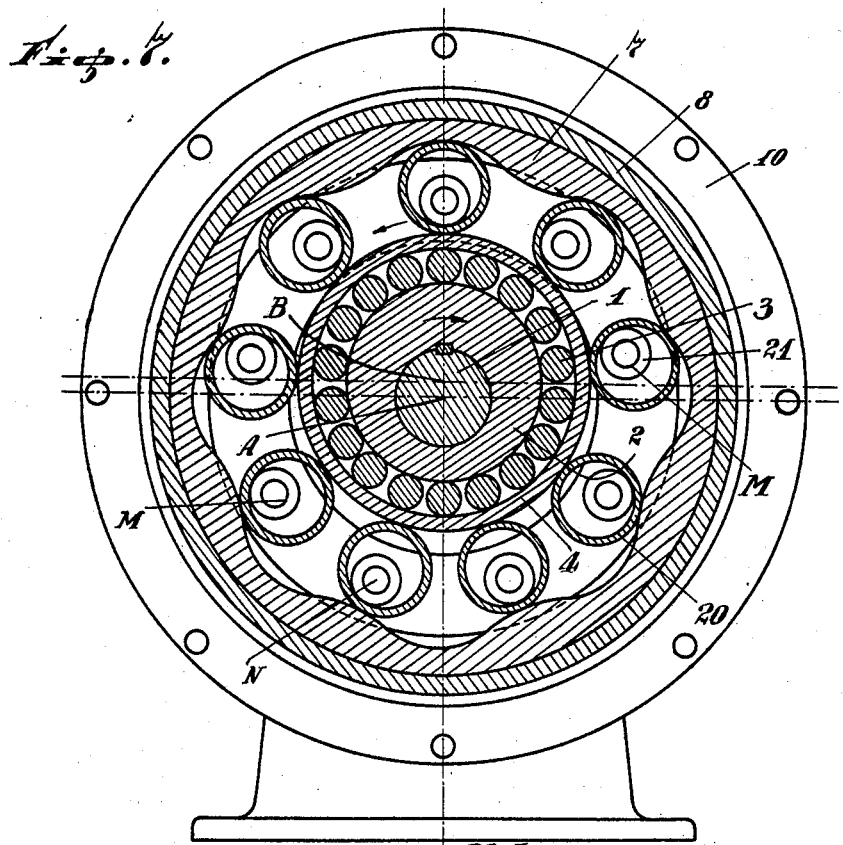
Fig. 7 is a vertical section similar to that of Fig. 1, but in which hollow rollers are used as transmission means.
Figure 8:
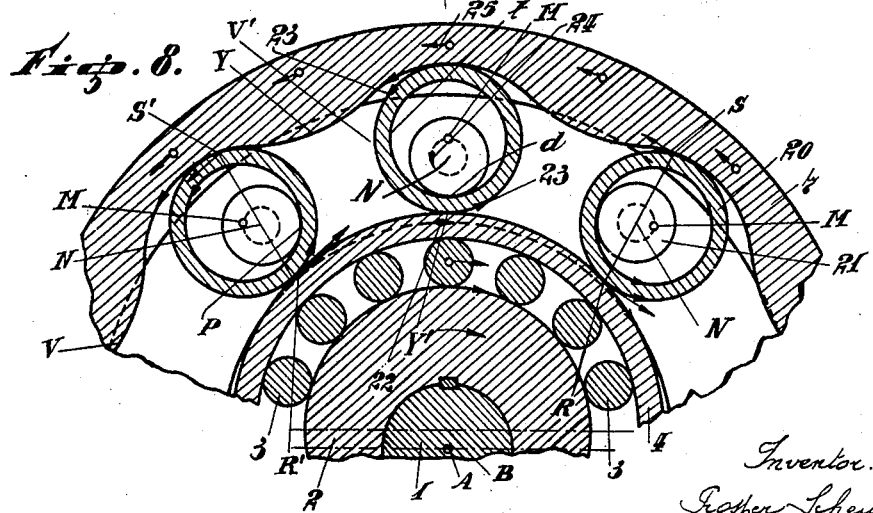
Fig. 8 illustrates part of the apparatus of Fig. 7 on a larger scale and shows the relative movement of the individual elements.

In Figs. 7, 8 and 9, reference number 20 illustrates the hollow rollers having the axis M. The rollers 5 and 20 operate in substantially the same way. Said rollers will permanently engage on the one hand with the outer toothed gear 7, on the other hand with the eccentric 2 or the freely rotating ring 4. Said rollers are conveniently guided so that, by their rolling movement, their rolling axes describe a circular movement which is identical to the movement described by the center B of the eccentric 2 about the center A, said circular movement of the roller axes being in the same or in the opposite direction. Such duplicate movement can be obtained, for instance, by guiding each of the rollers about pivots 6 arranged on the casing wall D (Fig. 3). Said rollers can also be guided in holes provided in the casing walls as illustrated in Fig. 4, or hollow rollers can also be used such as illustrated in Figs. 5, 7, 8 and 9, said rollers being guided or supported about fixed studs 21, said studs being eventually mounted between lateral rings.

The ring $b$ in Figs. 1, 3, 10 and 11, maintains the rollers all in correct engagement with gear 7. Consider the position of the rollers 5 in Fig. 2: the roller 5 on the right is maintained in contact with ring 4 and a tooth of gear 7, and against the corresponding pin 6, by the push of the ring $b$ produced by the roller 5 on the left and inversely this roller 5 on the left is maintained in contact by the opposite push of the ring, produced by roller 5 on the right. If a roller 5 lost proper contact between 4 and 7, it would unavoidably jam and break before the next revolution of eccentric 2 was completed.

As shown in Fig. 9, the pins 21 may also be connected by means of a ring 26, but which is not loose.

7 designates a gear wheel provided for instance with eight suitably profiled teeth and connected concentrically through the agency of the wall 8 to the driven shaft. The number of teeth and rollers may vary but must be in accordance with the following relations in which $e$ designates the number of rollers and $d$ the number of teeth:

In the case of solid rollers: $d=e+1$

In the case of hollow rollers: $d+1=e$.

If with reference to Figs. 1, 2 and 3, and more particularly to Fig. 2, it is assumed that the eccentric 2 rotates in a clockwise direction (arrow 11), each roller 3 of the transmission rollers will rotate anti-clockwise; the complete roller combination, however, will be moved in a clockwise direction (arrow 12) and the crown 4 will move in an anti-clockwise direction (arrow 13). The rollers 5 have a duplicate movement, namely a rotation about the axis in the direction of arrow 14 (Fig. 2), whereas at the same time the axes L of the rollers describe a circular movement, in the direction of the arrow 15, about the axis K of studs 6, said circular movement being identical to the circular movement of the center B about the axis A. By this duplicate movement, the crown 7 will rotate in a clockwise direction (arrow 16, Fig. 2). By this particular arrangement with reference to Figs. 1, 2 and 3, the direction of transmission is not reversed.

If with reference to Figs. 7, 8 and 9, the same direction of rotation for shaft 1 and eccentric 2 will be assumed, such as described in the foregoing example, the ring 4 will move in a clockwise direction (arrow 22, Fig. 8). Each roller 20 has a duplicate movement, i. e. a rotation about the axis M in the direction of arrow 23, namely in anti-clockwise direction, whereas simultaneously the axes M of the rollers describe a circular movement in the direction of arrow 24 about the axis N of studs 21, said circular movement being identical but in a reverse direction to the circular movement of center B about axis A. These movements will result in that the inner wall of the hollow rollers 20 will develop on the periphery of the fixed studs 21.

The transmission effort is constantly operated following levers R—N and N—S, namely tangential to crown 7, which will move in an anti-clockwise direction, as indicated by arrow 25.

The tangential component of the thrust of the eccentric 2 on the roller 20 acts according to arrow 40, the perpendicular component of the same thrust in the direction of arrow 41. It is easily found that these two components act on the roller to produce couples having the same sense of rotation (according to arrows 23 and 24). The roller pivoting constantly around its point of contact 42 around the pin 21 produces on the driven member a thrust 43 which gives an important component 44, tangential to the circle of rotation of the driven member passing through point 39. Taking into account all the forces acting between the driving and driven members, the resultant force 43 on the driven member is more tangential than in previously known devices of this kind, resulting in greater efficiency of my mechanism.

For a complete revolution of the driving shaft, the axis of each roller 5 will have described a complete circular movement, whereas crown 7, in the case of solid rollers, will have moved over the angle determined by dividing 360° by the number of teeth; in the examples illustrated, the transmission ratio will be 1 to 8. If Z designates the ratio of transmission, i. e. the number of revolutions of the driving shaft for each complete revolution of the driven member, the following formula must be taken:

In the case of solid rollers: $Z=d=e+1$.

The same number of teeth in the arrangement with hollow rollers 20 will produce a ratio of transmission equal to that number plus one, and the following formula must be taken:

In the case of hollow rollers: $Z=d+1=e$.

I claim:

1. A speed reducing gear comprising: a driving shaft, an eccentric on said driving shaft, a ring concentrically arranged and freely rotating about the eccentric, a driven shaft, a circular crown supported by said driven shaft, raised portions forming a cam face inside the crown and facing the ring and the eccentric, solid transmission rollers arranged between the ring and the interior cam face, said solid rollers being in all cases equal to the number of raised portions of the interior cam face minus one, and fixed guiding studs for the rollers.

2. A speed reducing gear comprising: a driving shaft, an eccentric on said driving shaft, a ring concentrically arranged and freely rotating about the eccentric, a driven shaft, a circular crown supported by said driven shaft, raised portions forming a cam face inside the crown and facing the ring and the eccentric, and solid transmission rollers arranged between the ring and the interior cam face, said rollers engaging guiding holes formed in a fixed wall.

3. A speed reducing gear comprising: a driving shaft, an eccentric on said driving shaft, a ring concentrically arranged and freely rotating about the eccentric, a driven shaft, a circular crown supported by said driven shaft, raised portions forming a cam face inside the crown and facing the ring and the eccentric, hollow rollers arranged between the ring and the interior cam face, said hollow rollers being in all cases equal to the number of the said raised portions plus one, and fixed guiding studs for the rollers.

4. A speed reducing gear comprising: a driving shaft, an eccentric on said driving shaft, a ring concentrically arranged and freely rotating about the eccentric, a driven shaft, a circular crown supported by said driven shaft, raised portions forming a cam face inside the crown and facing the ring and the eccentric, hollow rollers arranged between the ring and the interior cam face, and fixed guiding studs for the rollers, the arrangement being such that the tangential component of the thrust of the driving member on each hollow roller produces on the latter a couple which acts in the same sense of rotation as the couple produced on the same by the perpendicular component of the same thrust, substantially as set forth.

In testimony whereof I signed hereunto my name.

PROSPER SCHEUER.